United States Patent [19]

Brandt et al.

[11] Patent Number: 4,475,204
[45] Date of Patent: Oct. 2, 1984

[54] METHOD AND APPARATUS FOR THE PRODUCTION OF FLAT, TRANSPARENT VITREOUS SILICA SLABS OF LOW BUBBLE CONTENT

[75] Inventors: Lutz Brandt, Maintal; Karl Kreutzer, Gelnhausen-Meerholz; Karlheinz Rau, Hanau; Horst Schmidt, Rodenbach; Fritz Simmat, Gelnhausen, all of Fed. Rep. of Germany

[73] Assignee: Heraeus Quarzschmelze GmbH, Hanau, Fed. Rep. of Germany

[21] Appl. No.: 417,767

[22] Filed: Sep. 13, 1982

Related U.S. Application Data

[62] Division of Ser. No. 254,579, Apr. 16, 1981.

[30] Foreign Application Priority Data

May 7, 1980 [DE] Fed. Rep. of Germany ....... 3017392

[51] Int. Cl.³ .............................................. C03B 5/02
[52] U.S. Cl. ..................................... 373/27; 373/122; 65/136

[58] Field of Search ................. 373/27, 112, 118, 122, 373/137; 65/356, DIG. 4, DIG. 8, 136, 18.1

[56] References Cited

U.S. PATENT DOCUMENTS 1,572,894  2/1926  Little ............................. 373/137 X
3,142,717  7/1964  Appleman et al. .................. 373/27

FOREIGN PATENT DOCUMENTS 799363  6/1936  France ................................. 373/27

Primary Examiner—Roy N. Envall, Jr.
Attorney, Agent, or Firm—Sprung Horn Kramer & Woods

[57] ABSTRACT

Flat, transparent slabs of vitreous silica of optical quality are produced by melting granular starting material in a vacuum by means of an electrical heating system. The starting material is melted while sustaining a heat flow from the top to the bottom of the crucible. The bottom of the crucible is made permeable to gases. The heat isolation power of the crucible wall increases from the bottom to the top of the crucible.

15 Claims, 9 Drawing Figures

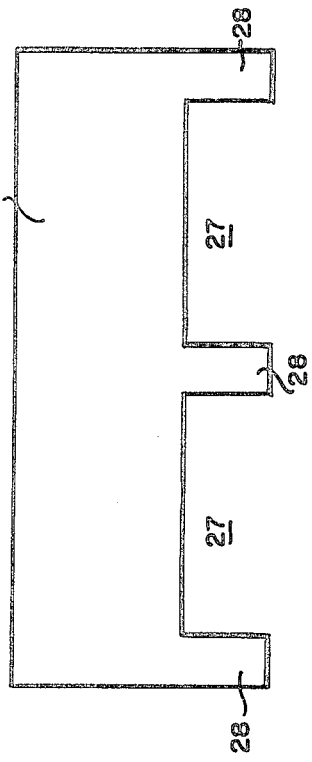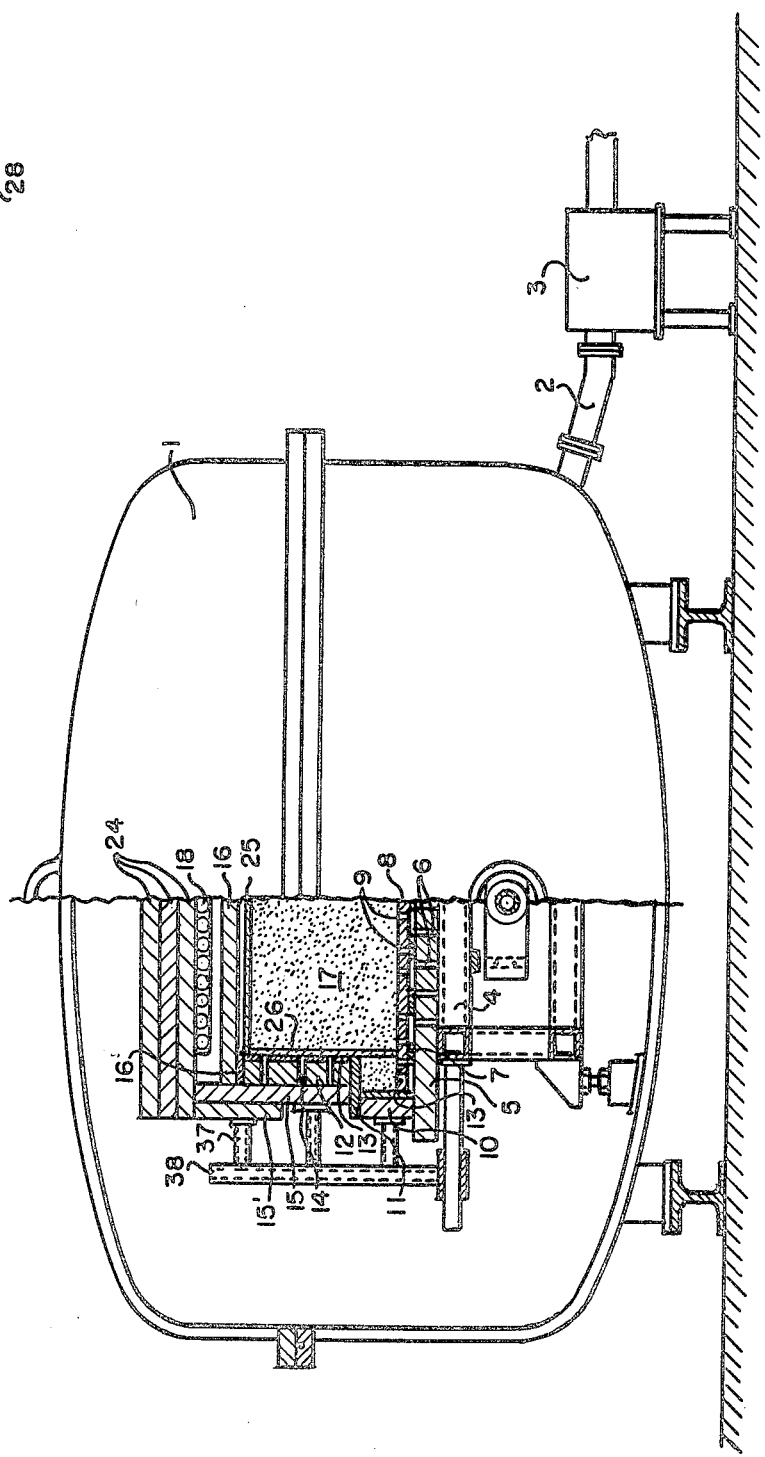

ngth and widths greater than the
METHOD AND APPARATUS FOR THE PRODUCTION OF FLAT, TRANSPARENT VITREOUS SILICA SLABS OF LOW BUBBLE CONTENT This is a division of application Ser. No. 254,579, filed Apr. 16, 1981.

BACKGROUND OF THE INVENTION

1. Field of the Invention

The invention relates to a method of producing flat, transparent vitreous silica bodies of optical quality and low bubble content, in which granules or powder ground from crystalline quartz, amorphous vitreous silica or pure quartz sand as starting material, is melted in a crucible under vacuum by means of an electrical heating means, and an apparatus for carrying out such method.

2. Discussion of Prior Art

German Pat. No. 445,763 discloses a method of producing flat objects from fused quartz by means of electrical resistance furnaces. In this method, a rod-like electrical heating resistance is surrounded by the starting material to be melted and, and the action of the heating current, produces a fused tubular body. Then the heating resistance is rapidly drawn out of it, and the body is squeezed flat to form a plate.

German Pat. No. 697,699 discloses the production of bubble-free bodies from fused vitreous silica. The starting material is mostly clear pieces of natural quartz crystal, which are melted down and then shaped by conventional methods. It also discloses the production of vitreous silica bodies by first forming compacts of the desired shape from silica powder and then heating them in a vacuum in an electrical furnace until they vitrify. The production of quartz blocks in a vacuum from granular starting material is also known, the blocks being then reheated and pressed to final shape.

In view of the fact that the products produced by the above-mentioned methods contain a great many bubbles, even though German Pat. No. 697,699 speaks of bubble-free bodies, the production of substantially bubble-free, clear vitreous silica products, i.e., products of low bubble content, has been accomplished in accordance with U.S. Pat. No. 2,726,487 by impregnating the granular starting material, such as pure quartz sand, with a silicate solution and, after drying out the liquid component, causing $SiO_2$ to become deposited in the pores of the starting material, the material is melted in a vacuum in a graphite crucible. In this manner, transparent, flat slabs of low bubble content are obtained from vitreous silica.

SUMMARY OF THE INVENTION

It is an object of the invention, therefore, to provide large-area vitreous silica slabs of optical quality in a very simple and economical manner. It is a further object to provide a process for the production of vitreous silica slabs of thickness of more than 10 cm and up to 150 cm whose length and breadth are larger, which process does not require and can be performed without impregnating the starting material with an impregnant such as a silicate solution.

In accordance with the invention, this object is achieved in the method described above, in that, for the production of large-area vitreous silica slabs having a thickness of more than 10 cm, but not more than 150 cm, and having lengths and widths greater than the thickness, the starting material is heated in the crucible from the top down, and is melted by the maintenance of a heat flow directed substantially from the upper edge of the crucible toward the bottom of the crucible.

Additional advantageous features of the method of the invention will appear from the ensuing disclosure and appended claims.

The apparatus of the invention for the practice of the method has within an evacuable housing a crucible to receive the starting material, and an electrical heating means. It comprises in accordance with the invention, a crucible at least whose bottom is permeable to gases, the heat isolation power of the crucible wall increases from the bottom of the crucible to its upper edge, and that the heating means is disposed at a predetermined distance above the crucible.

Advantageous embodiments of the apparatus of the invention for the practice of the claimed method are set forth below.

By the method of the invention one can produce flat fused vitreous silica bodies of optical quality of one metric ton of charge weight, which permits one to use fused vitreous silica for large optical applications such as, for example, telescope mirrors and large, flat windows such as are often needed in space vehicle construction, without the need for the costly welding together of individual components as heretofore. By the method of the invention, which produces a heat flow from the top edge of the crucible toward the bottom thereof, extraordinarily homogeneous vitreous silica slabs are produced. By use of the apparatus described herein heat is caused to flow downwardly onto the surface of the starting material from a source at or above the top edge of the crucible. That heat is caused to move toward the bottom of the crucible as the melting process continues.

BRIEF DESCRIPTION OF DRAWINGS

The method of the invention and the apparatus of the invention for the practice of the method are explained with the aid of FIGS. 1 to 6. These are embodiments to which, of course, the invention is not be be restricted.

FIG. 2 shows a melting furnace, partially in elevation and partially in a vertical cross section transversely of the long axis of the vitreous silica slab which is to be cast;

FIG. 3 is a view of the vitreous silica plate serving as a crucible lining;

DESCRIPTION OF SPECIFIC EMBODIMENTS

Figure 1:
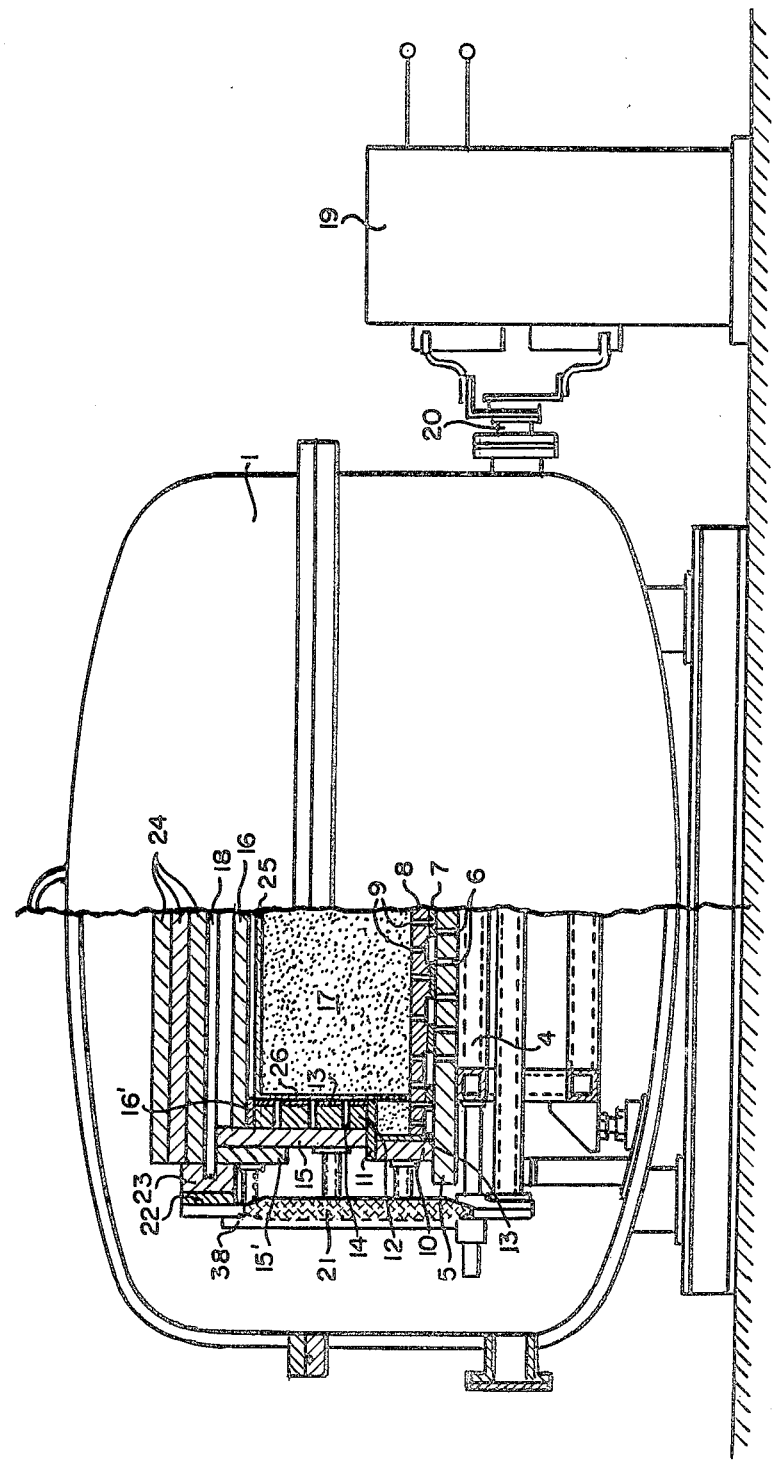
FIG. 1 shows a melting furnace, partially in elevation and partially in a vertical cross section taken lengthwise of the long axis of the vitreous silica slab which is to be cast.

Referring to FIGS. 1 and 2, reference number 1 designates a water-jacketed vacuum tank which is connected at 2 (FIG. 2) to a vacuum pump 3. The water-cooled charging table 4 (FIG. 1) is disposed inside of the vacuum tank, and the crucible structure is placed on the charging table 4. The crucible is composed of a number of parts, one of which is a graphite plate 5 provided with holes 6, which lie on the charging table 4. On this graphite plate 5 there are disposed graphite spacers 7 on which the crucible bottom plate 8, likewise provided with holes 9, is mounted. The side wall structure of the crucible is erected on the graphite plate 5, being composed first of a graphite plate 10 in which is surmounted by a graphite strip 11 on which the graphite plate 12 stands. This arrangement results in a crucible wall structure consisting of sections which are not in thermal contact with one another.

Instead of this arrangement, one can make the entire crucible wall of one-piece graphite plates provided with offsets running parallel to the top edge of the crucible. Thin graphite plates 13 are fastened to the inner side of plates 10 and 12 by means, for example, of graphite pins 14. The plates 13 are made of high-purity graphite. The outer side of the graphite plate 12 is thermally insulated with a layer of carbon sponge, the thickness of the carbon sponge layer 15 increasing from the bottom plate of the crucible to the upper edge thereof, this being accomplished, for example, by attaching an additional carbon sponge plate 15'. The crucible walls are supported by props 37 mounted on supports 38.

While the melting is in progress, the crucible is covered by a heat equalizing plate 16, preferably with the interposition of the thermal insulation 16', which serves for the equalization of the temperature on the surface of the starting material 17 confronting the electrical heating means 18. The heat equalizing plate which can have a thickness of 5 to 100 mm has good thermal conductivity e.g., at least 0.16 W/cm·K. This brings it about that the starting material is heated at a very uniform temperature. The electrical heating means 18 is powered by a high-current transformer 19 through the water-cooled coaxial lead-through 20, copper straps 21 and water-cooled bus bars 22 with the interposition of graphite blocks 23. The thermal insulating boards 24 made of sponge carbon or carbon felt are supported on the sponge carbon plates 15 and 15' so as to separate the heating means 18 from the vacuum tank 1.

It has been found advantageous to cover the surface of the starting material 17 confronting the heating means with a fused vitreous silica plate 25, suitably 1.0 to 15.0 mm thick. This is intended to prevent any possible reaction between the graphite structural elements of the apparatus and the starting material itself. This purpose is also served by the vitreous silica plates 26 also used to cover the walls of the crucible, and illustrated also in an elevational view of FIG. 3. These vitreous silica plates have recesses 27 so as to form feet 28 on the plate. At least during part of the melting process, a heat equalizing plate 16 of material having good thermal conductivity may be disposed between the electrical heating means 18 and the starting materials 17, on the one hand, and the vitreous silica plate 25 on the other.

In the section making reference to parent application Ser. No. 254,579 amend the same to indicate that it is now U.S. Pat. No. 4,377,405.

Figure 4:
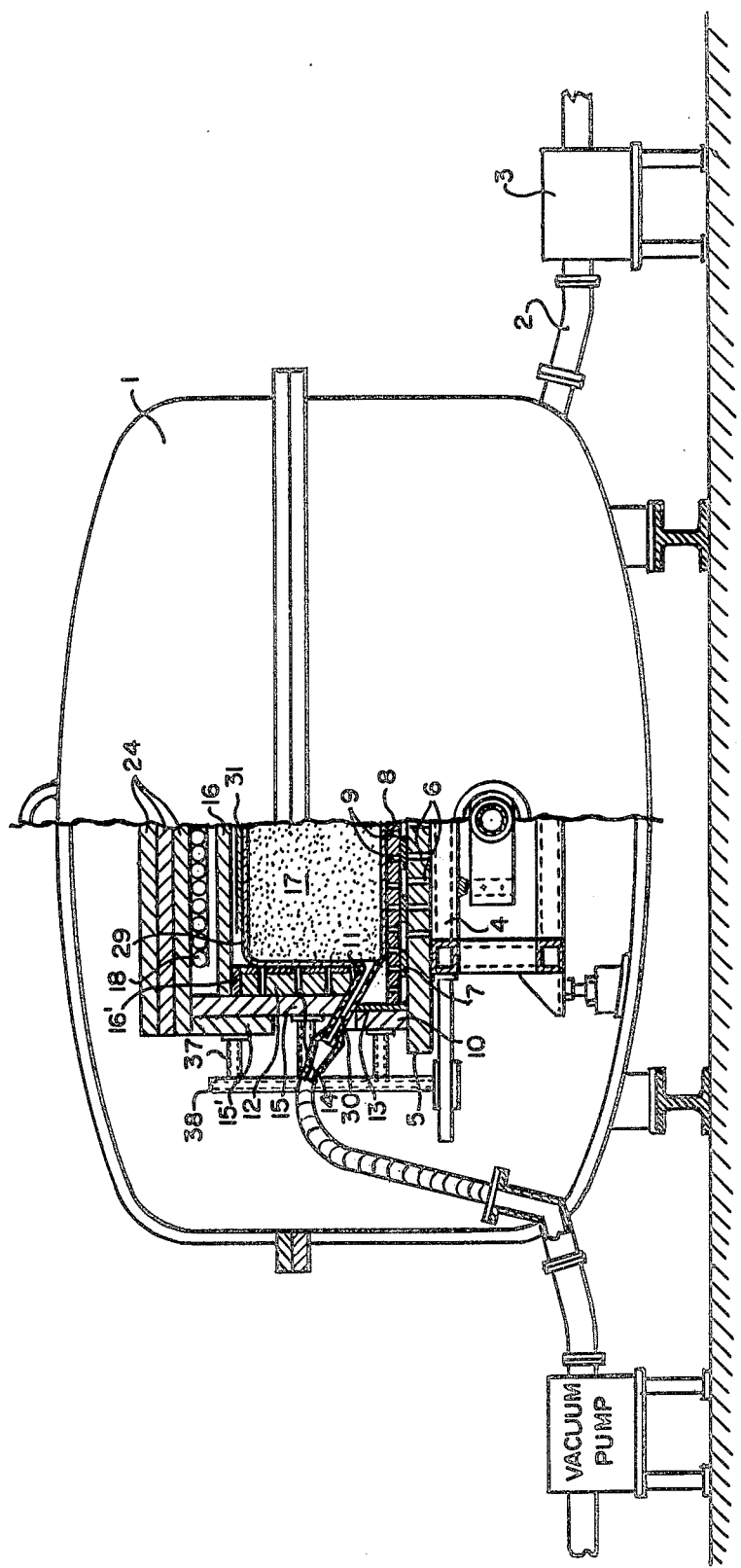
FIG. 4 shows a melting furnace, partially in elevation and partially in a vertical cross section taken transversely of the long axis of the vitreous silica slab which is to be cast.

The embodiment of the apparatus of the invention represented in FIG. 4 differs from the one shown in FIGS. 1 and 2 essentially in that, instead of the crucible lining composed of the vitreous silica plates 25 and 26, a tank 29 made of vitreous silica is inserted into the crucible itself and is equipped with an evacuating connection 30, whose open top is closed with a lid 31 of vitreous silica after the tank has been filled with the starting material 17.

In FIG. 5, the progress of the melting inside of the crucible is represented at 5a to 5d.

Figure 5A:
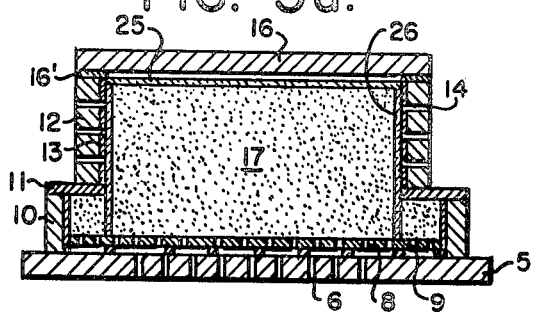
FIGS. 5a, 5b, 5c are a diagrammatic representation of the progress of the melting in the crucible.

FIG. 5a shows a crucible filled with the starting material 17 before the melting process begins.

When a pressure in the range of about 150 Pascal is reached in the vacuum tank by means of the vacuum pump 3, the heating means 18 is supplied with electric current and the melting begins. First a layer 32 of condensed reaction products forms within the granular starting material due to the reaction taking place between the starting material and the furnace atmosphere in the vacuum tank. This layer 32 migrates through the starting material during the melting, in the form of a front advancing ahead of the trailing molten layer 33. The molten layer 33 grows towards the crucible bottom, causing a vacant space 34 to form between the heat equalizing plate 16 and the melt 33.

Figure 5B:
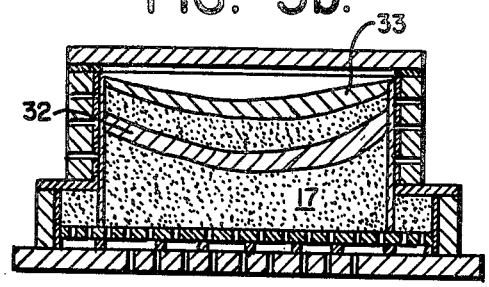
Figure 5C:
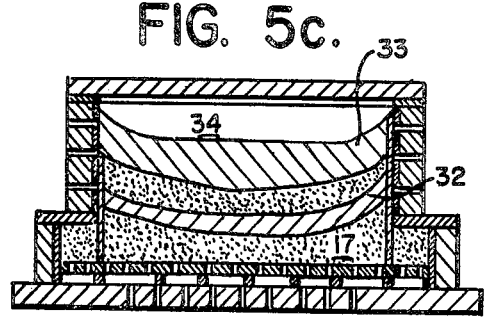
Figure 5D:
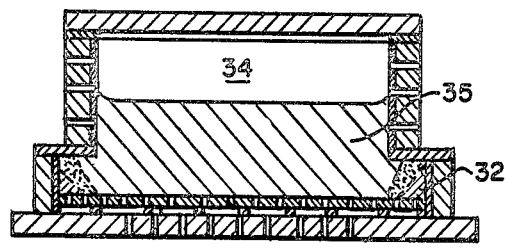

FIGS. 5b and 5c show the melting at various times, 5b in the initial stage, 5c at an advanced stage. In FIG. 5d the melting process has ended, and all of the starting material has been melted except for some residue of the starting material and part of the layer 32. In FIG. 5d it can be seen that the larger cross section of the crucible adjacent the bottom of the crucible has the advantage that the unavoidable waste portions of the molten slab are reduced to a minimum. The waste protions are largely confined to the peripherally running cavity at the base of the crucible.

It is also possible, instead of the single offset in the crucible walls, to create multiple offsets along the crucible wall, thereby contributing to a more uniform heat flow from the top edge to the bottom of the crucible and hence to the formation of more homogeneous slabs.

Figure 6:
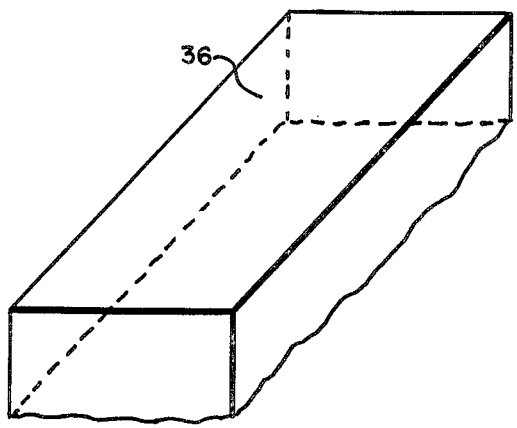
FIG. 6 is a perspective representation of a fused vitreous silica slab made in accordance with the invention.

After the slab 35 has cooled, the vacuum in the furnace is relieved, the vacuum tank is opened, the pieces forming the crucible wall are removed, then the glass slab is removed from the vacuum tank and trimmed, by sawing, for example, to form a vitreous silica slab 36, as represented in FIG. 6.

The method of the invention had made it possible to produce a vitreous silica slab 36 of the following dimensions: width 100 cm, length 150 cm, thickness 50 cm. Such slab made by the method of the invention has a weight of 1.65 metric tons.

What is claimed is:

1. In an apparatus for the formation of optical slabs comprising an evacuable housing, an electrical heating means and a crucible for receiving the material to be melted and formed into a slab, the improvement wherein the crucible bottom is gas-permeable, and the heat isolation power of the crucible wall (10, 12) increases from the crucible bottom (8) to the crucible upper edge, and electrical heating means (18) is disposed at a predetermined distance above the crucible.

2. An apparatus according to claim 1, wherein the gas-permeable crucible bottom (8) has a plurality of holes (9).

3. An apparatus according to claim 1, the crucible bottom (8) is disposed over a graphite plate provided with a plurality of holes (6), and graphite spacers (5) are disposed between said crucible bottom and said graphite plate.

4. An apparatus according to claim 1, wherein the crucible is composed of graphite plates (8, 10, 12).

5. An apparatus according to claim 2, wherein the crucible walls are provided internally with thin plates of a material which reacts to a negligible extent with molten vitreous silica.

6. An apparatus according to claim 5, wherein said plates (13) comprise high-purity graphite.

7. An apparatus according to claim 2, wherein, between the heating means (18) and the crucible upper edge, there is situated a heat equalizing plate (16) thermally insulated therefrom.

8. An apparatus according to claim 7, wherein the heat equalizing plate comprises a graphite plate.

9. An apparatus according to claim 2, wherein a thermal insulating element of foam carbon or carbon felt is disposed in the space between the electric heating means (18) and the evacuable housing.

10. An apparatus according to claim 2, wherein the cross section of the crucible interior is expanded at least in the vicinity fo the crucible bottom.

11. An apparatus according to claim 2, wherein crucible walls are covered with vitreous silica plates.

12. An apparatus according to claim 1, wherein an evacuable vitreous silica tank (29) containing the starting material is disposed in the crucible.

13. An apparatus according to claim 1, wherein the crucible wall is built up of sections disposed one above the other and not in thermal contact with one another.

14. An apparatus according to claim 1, wherein the crucible walls are provided internally with thin plates of a material which does not react at all with molten vitreous silica.

15. An apparatus according to claim 1, wherein the crucible wall is constructed in one piece with offsets running parallel to the crucible upper edge.

* * * * *